INVENTOR
ERNST F.R.A. SCHLOEMANN
BY
ATTORNEY

INVENTOR
ERNST F.R.A. SCHLOEMANN
ATTORNEY

| CURVE | A₁ | A₂ | D₁ |
|---|---|---|---|
| 2 | 0.1 | 0.34 | 0.28 |
| 4 | 0.1 | 0.19 | 0.33 |
| 6 | 0.6 | 0.075 | 0.20 |

DIFFERENTIAL PHASE SHIFT (IN REDUCED UNITS) $\Delta\Gamma/2K_1K_2$ $D_2 = d_2/2\pi\lambda_0$
CENTRAL FERRITE WIDTH

INVENTOR
ERNST F.R.A SCHLOEMANN
BY
ATTORNEY

Sept. 10, 1968  E. F. R. A. SCHLOEMANN  3,401,361
RECIPROCAL LATCHING FERRITE PHASE SHIFTER
Filed May 17, 1966  5 Sheets-Sheet 4

INVENTOR
ERNST F.R.A. SCHLOEMANN
BY
ATTORNEY

Sept. 10, 1968  E. F. R. A. SCHLOEMANN  3,401,361
RECIPROCAL LATCHING FERRITE PHASE SHIFTER
Filed May 17, 1966  5 Sheets-Sheet 5

INVENTOR
ERNST F.R.A SCHLOEMANN
BY
ATTORNEY

United States Patent Office 3,401,361
Patented Sept. 10, 1968

3,401,361
RECIPROCAL LATCHING FERRITE PHASE SHIFTER
Ernst F. R. A. Schloemann, Weston, Mass., assignor to Raytheon Company, Lexington, Mass., a corporation of Delaware
Filed May 17, 1966, Ser. No. 550,729
23 Claims. (Cl. 333—31)

ABSTRACT OF THE DISCLOSURE

A reciprocal phase shifter having discrete ferrite bodies providing a symmetrical distribution of magnetization states about the center plane of a waveguide transmission structure. A pair of outer toroid body members are arranged equidistantly on either side of a third separate discrete central ferrite body member which is bisected by the center plane. The outer body members provide a binary magnetization state capability by reversal of current direction and the central body member is either permanently magnetized or electromagnetically controlled by separate means. To obtain reciprocal phase shift the outer toroid bodies are required to be magnetized in opposite directions. The phase shift characteristics of the ferrite material at the center of the guide is always dependent on the direction of magnetization of the outer bodies. The applied magnetic fields are transverse to the direction of electromagnetic wave energy propagation.

---

The present invention relates generally to reciprocal microwave phase shifters and more specifically to such devices employing latching techniques wherein a differential phase shift of electromagnetic wave signals is induced by means of passage of current pulses through an array of magnetic structures having a distribution of magnetization arranged symmetrically with respect to the center plane of a transmission structure such as a hollow pipe waveguide.

In recent years electronically scanned antennas have achieved considerable importance in the communications as well as radar fields. In such antennas beam positioning is accomplished at very rapid rates of speed utilizing electronically actuated circuits without any mechanically moving parts. Each antenna radiating element requires at least one phase shifting device with the parameters of the phase shift accurately and rapidly controlled by electrical means. Antennas several stories in height and many hundreds of feet in length incorporating thousands of individual radiating elements are utilized in such systems. Among the many classes of devices suggested for the accomplishment of the required phase shift is a class of devices utilizing the variable RF permeability of magnetic materials such as ferrites. Two configurations of such ferrite phase shifters now common in the art include either longitudinal or transverse applied magnetic field producing means which together with the alternating electromagnetic fields of the RF propagated energy induce a phase shift when such energy propagates through the ferrite magnetic material. Generally the applied magnetic field configurations result in externally disposed electrical coils which introduce many problems by their weight and bulkiness. The phase shift is dependent upon the strength of the electric current that flows through the coils or other magnet field producing means. In operation of the device an electric holding current is required to achieve predetermined phase shift. A good discussion of the applicable antenna systems as well as prior art ferrite phase shifters may be found in the reference "Survey of Electronically Scanned Antennas," Part 1 and Part 2, by Harold Shnitkin, the Microwave Journal, Dec., 1960, pp. 67–72, and January 1961, pp. 57–64.

Some of the problems associated with prior art ferrite phase shifters may be alleviated by the relatively new latching techniques employed with ferrite bodies. Such devices employ a sample shape in which the magnetic flux lines are closed, for instance samples in the shape of toroids. A phase shifting device incorporating ferrite toroids has the advantage that in the operation of the device no external holding electrical current is required to maintain the requisite magnetization state. Switching may be performed between two remanent states of magnetization by means of current pulses traversing any current conduction means disposed within the toroid. The direction of the current pulses either reverse the direction of the magnetization or leave it unchanged. Devices characterized by the toroid magnetic material configuration and current pulse conduction means to perform the switching operation are generically referred to as latching ferrite phase shifters. The toroid material is conventionally disposed along the central longitudinal axis of rectangular waveguide propagating energy in the fundamental mode, referred to as the $TE_{10}$ mode in the art. Ridged, strip, as well as coaxial waveguide configurations have also been suggested wherein electromagnetic waves may be propagated. Latching ferrite phase shifting devices described in the art are inherently nonreciprocal, i.e., the phase shift through a given section of transmission line is different for propagation in opposite directions. In many radar applications, however, a phase shifter having reciprocal characteristics is desirable because it facilitates the use of a common antenna for transmission and reception without the need for reversing the polarity of each phase shifter in the antenna between transmission and reception of each radar pulse.

The present invention, therefore, has as its primary object the provision of a reciprocal ferrite phase shifting device having a binary state of magnetization capability.

Still a further object of the present invention is the provision of a ferrite phase shifter having in combination a plurality of toroid magnetic structures together with current pulse switching means and a centrally disposed ferrite material structure wherein a field-dependent permeability for the central structure is obtained with all the magnetic structures having an applied magnetic field transverse to the direction of electromagnetic wave propagation.

Still another object of the present invention is the provision of a latching device having a plurality of outer ferrite magnetic bodies and a central body arranged within a wave transmission line wherein the distribution of magnetization through a cross section of the transmission line is symmetrical with respect to its center plane and the sense of polarization of a magnetic field in the center of the wave transmission line is reversed by reversal of the sense of polarization of the outer bodies.

Still a further object of the present inventon is the provision of a latching ferrite device having a central member disposed along the longitudinal axis of a rectangular waveguide transmission section and two oppositely magnetized toroid ferrite structures disposed equidistantly on either side thereof and means for establishing magnetizing fields within the ferrite members in a predetermined manner in order that propagation of electromagnetic energy in either direction will encounter the same sense of polarization of a magnetic field together with any desired differential phase shift.

Other objects, features and advantages of the present invention will be evident after consideration of the following detailed description together with the accompanying drawings, wherein:

Figure 12:
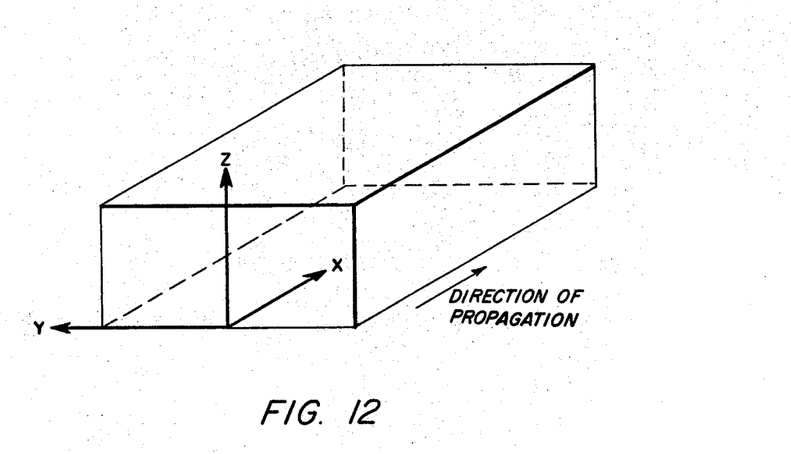
FIG. 12 illustrates the orientation of the coordinate axes with respect to the rectangular waveguide as used in the description of the present invention.

Before proceeding with the detailed description of the invention it will be of assistance to review a few of the fundamental and underlying principles relative to the art of ferromagnetics, ferrites and propagation of electromagnetic energy in the fundamental or $TE_{10}$ mode in waveguide loaded with transversely magnetized structures for either reciprocal or nonreciprocal operation as well as differential phase shift. An excellent review of some of the over-all basic theory relative to ferrites and behavior in microwave devices is given in the paper entitled "The Elements of Nonreciprocal Microwave Devices" by C. Lester Hogan, Proceedings of the IRE, October 1956, pp. 1345–1368, and need not be elaborated on herein. Reference will be made in this discussion to the system of coordinate axes employed by most writers in this field and illustrated in FIG. 12. The conventional designations show the Z axis as extending perpendicular to the direction of propagation of energy and parallel to the waveguide narrow walls, the X axis extending along the longitudinal axis and parallel to the broad walls with the Y axis directed perpendicular to the X axis. It is known in the art that rectangular waveguides containing ferrite slabs magnetized in the direction of the Z-axis can propagate electromagnetic energy in various modes referred to as TE modes. In these modes the electric field associated with the propagating energy is aligned with the Z-axis, and the magnetic field associated with the propagating energy lies in the plane of the X and Y axes. For each waveguide loaded with ferrite slabs in the manner previously described there exist a frequency band in which only a single mode can propagate. This mode is known as the fundamental mode or $TE_{10}$ mode.

The magnetic field associated with a $TE_{10}$ mode propagating in an empty waveguide is linearly polarized near the waveguide walls and also along the center plane of the waveguide. At all other points within the waveguide, however, the field is elliptically polarized. It rotates in the plane of the X–Y axes, with the two axes of the ellipse being oriented along the X and Y axes. For a given direction of propagation the directions of rotation of the magnetic field on the two sides of the center plane are opposite to each other. If the direction of propagation is reversed, the directions of rotation are also reversed.

The term center plane shall be interpreted to define the central or longitudinal axis of the waveguide structure extending perpendicular to the broad sidewalls and may also be referred to as the symmetry plane of waveguide.

It is now well known that the response of a magnetized ferrite to a magnetic field, which rotates in a clockwise (positive) direction is different from its response to a magnetic field which rotates in a counterclockwise (negative) direction. It is for this reason that a rectangular waveguide, which contains a ferrite slab magnetized along the Z-axis, is nonreciprocal unless the slab is located at the center of the waveguide. The phase shift experienced by a wave propagating in the direction of the positive X-axis is different from the phase shift experienced by a wave of the same frequency propagating in the direction of the negative X-axis. This phenomena is also true if two ferrite slabs are spaced equidistantly from the center plane of the waveguide and are magnetized in opposite directions. By contrast, however, if the aforementioned two equidistantly spaced ferrite slabs are magnetized parallel to each other the phase shift becomes reciprocal. It can be shown in general that for rectangular waveguide containing transversely magnetized ferrite slabs the phase shift associated with the $TE_{10}$ mode is reciprocal whenever the distribution of magnetization is symmetric with respect to the center plane of the waveguide.

We consider next the distribution of the alternating fields associated with RF electromagnetic energy propagated in a rectangular waveguide containing two symmetrically disposed ferrite slabs magnetized in the same direction. Even though the phase shift in such a structure is the same for two directions of propagation, the distribution of the RF fields is not similar. This effect has been referred to in the art as the "field-displacement" effect and has previously been used to obtain nonreciprocal attenuation. For a full description this effect reference is directed to an article by A. G. Fox, S. E. Miller and M. T. Weiss, Bell System Technical Journal, January 1955, pp. 5–102, and in particular, pp. 42–76, together with the text "Microwave Ferrites and Ferromagnetics" by B. Lax and K. J. Button, McGraw-Hill Book Co., Inc., 1962, pp. 364–372. The field-displacement effect then is helpful in understanding the principle of operation of the reciprocal phase shifter of the present invention.

Figure 1:
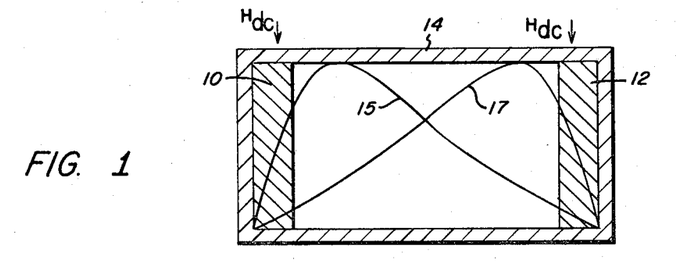
FIG. 1 is a diagrammatic representation of the field-displacement effect with electromagnetic wave propagation in ferrite loaded rectangular waveguide with symmetrical direction of magnetization.

FIG. 1 illustrates a waveguide section 14 loaded with ferrite slabs 10 and 12 and the distribution of the electric field associated with $TE_{10}$ waves propagating in two possible directions. In empty waveguide the electric field has a maximum at the center of the structure and the magnetic field is linearly polarized at this point. The effect of the two ferrite slabs is to shift the maximum of the electric field over towards one side of the waveguide as indicated by the solid line 15 for one direction of propagation as indicated by the solid line 15. When the direction of propagation is reversed the electric field maximum shifts towards the other side as indicated by the dotted line 17. By the same token the RF magnetic field associated with the wave is now elliptically, rather than linearly, polarized at the center plane of the waveguide. If the direction of propagation is reversed the sense of polarization of the magnetic field at the center of the guide remains the same. If the magnetization of the two ferrite slabs is reversed, however, the sense of polarization of the magnetic field at the center of the guide is also reversed. Thus the phase shift induced by a magnetized slab of ferrite placed at the center of the guide will be dependent upon the direction of magnetization of the two outer slabs.

Referring to FIGS. 2A–2D, this principle is further illustrated. A cross-section of rectangular waveguide 14 is shown having a ferrite member 20 located at the center and two outer members 16 and 18 spaced equidistantly from the center plane indicated by the dotted line 22. Four possible distributions of magnetization are illustrated by the arrows. All of these distributions are symmetrical and, therefore, give rise to a reciprocal phase shift. In addition to the distributions of magnetization which are shown several other distributions are possible which are not symmetric. Such distributions give rise to nonreciprocal operation and will, therefore, not be considered in the discussion of the present invention.

Figure 2A:
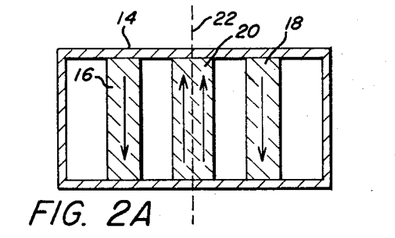
FIGS. 2A and 2D are schematic illustrations of a rectangular waveguide containing three transversely magnetized ferrite members with the arrows indicating the direction of magnetization.
Figure 2B:
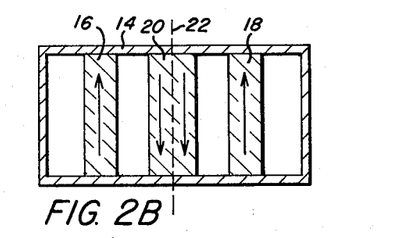
Figure 2C:
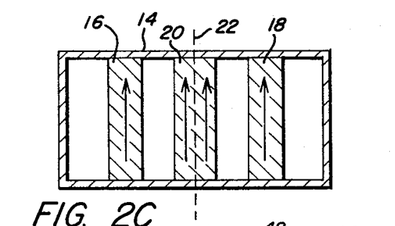
Figure 2D:
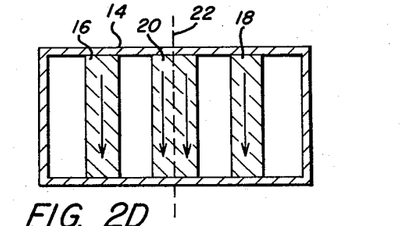

The two distributions designated in FIGS. 2A and 2B may be termed anti-parallel alignment and result in the same phase shift. In contrast the two distributions designated in FIGS. 2C and 2D may be termed parallel alignment and achieve the same phase shift. However, the phase shift associated with the distributions FIGS. 2C or 2D is different from the phase shift associated with the distributions FIGS. 2A or 2B.

Figure 3:
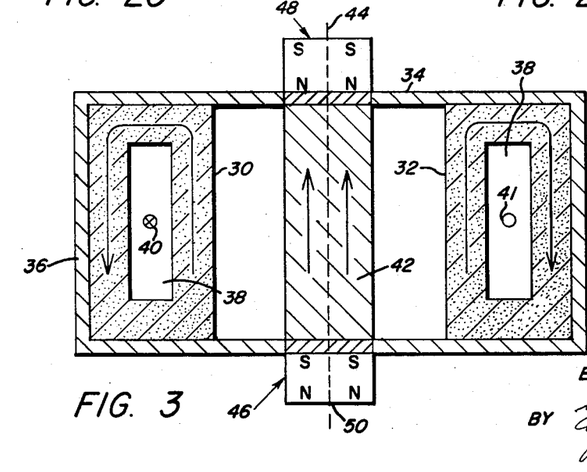
FIG. 3 is a cross-sectional view of an illustrative embodiment of the invention utilizing toroid ferrite structures.

To now reduce the aforementioned principles to practical considerations and also describe latching techniques attention is directed to FIG. 3. In this embodiment two symmetrically oriented toroid structures 30 and 32 are disposed within waveguide 34 adjacent to but not necessarily contacting the side walls 36. The principal feature of the toroid structure inherent in the latching mode of operation is encompassed by the central apertures 38 and electrical pulse conduction means 40 and 41 passing therethrough. The central ferrite member 42 is disposed symmetrically along axis 44 and is magnetized in this embodiment by oppositely disposed permanent magnets 46 and 48 joined to the broad walls of the waveguide 34. The permanent magnetic field for the central ferrite member may also be applied by other means, for example a horseshoe or C-shaped magnet, and conventional polar designations N and S are shown. It should be noted that in the operation of the device the direction of magnetization of the central ferrite member need not be altered. Thus reversal of the magnets will not be necessary. The toroid ferrite material configuration is desirable in that the magnetic flux lines are closed and in operation of the microwave device no holding current is required. For the latching mode of operation switching is performed by means of current pulses directed along wires 40 and 41. In accordance with the direction of current passage the distribution of magnetization in the outer ferrite members may be reserved or left unchanged. For the purposes of this description the arrows indicated in this view are for illustrative purposes only. In order to obtain reciprocal phase shift the two toroids must always be magnetized in opposite directions. The loop portions nearest to the side walls have relatively little effect upon the phase shift because the magnetic field is necessarily linearly polarized at this point. The direction of magnetization in the portion of the loops closest to the axis of symmetry therefore will be the determining operation as far as parallel or anti-parallel operation is concerned. In accordance with the well known principles of magnetic induction by the passage of an electrical current, wire 40 will have the current directed toward the reader as indicated by the crossed end to achieve the upwardly directed lines of the magnetic flux. Wire 41 will, however, have the current directed in the opposite manner or away from the reader as indicated by the open circle to achieve a corresponding flux line distribution. Current pulses sent through the conductive wires 40 and 41 then will magnetize the toroid structures to the remanent state of magnetization which is defined as the magnetic induction remaining in a body of magnetic material after removal of the applied magnetomotive force.

Figure 4A:
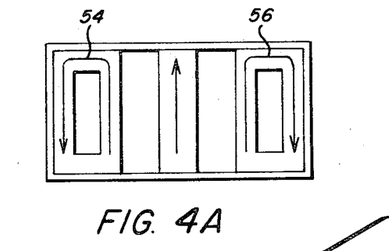
FIGS. 4A and 4B are schematic illustrations of the two states of magnetization which result in reciprocal differential phase shift in a device as shown in FIG. 3.
Figure 4B:
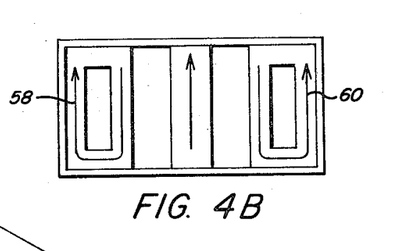

The two states of magnetization in the device shown in FIG. 3 are shown illustratively in FIGS. 4A and 4B with the arrows 54 and 56 as well as 58 and 60 indicating the directions of magnetization in a self-explanatory manner with the state of the magnetization of the central ferrite body member maintained constant. The differential phase shift is the difference between the two phase shifts associated with these two states of magnetization. The versatility of such a reciprocal latching ferrite device lends itself readily to digital operation utilizing conventional binary 0 and 1 values for the parallel and anti-parallel states of magnetization of the ferrite structures. Computerized control of the phase shift desired may therefore be easily facilitated by digital procedures in a phased array antenna system utilizing this latching mode of operation.

Figure 5:
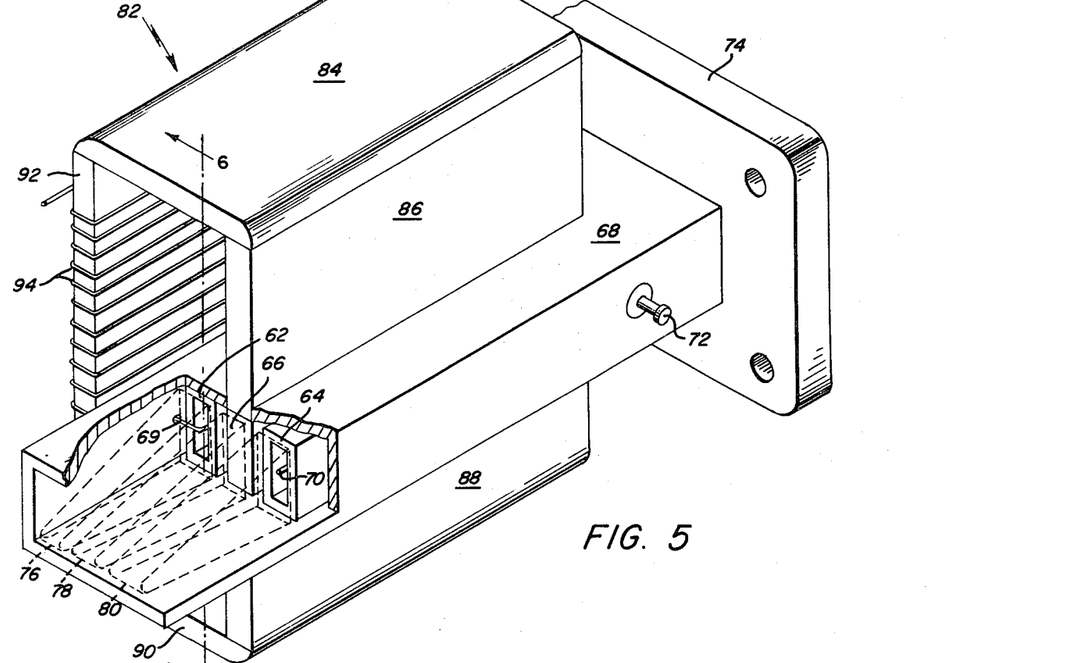
FIG. 5 is an isometric view of an illustrative embodiment of the invention.
Figure 6:
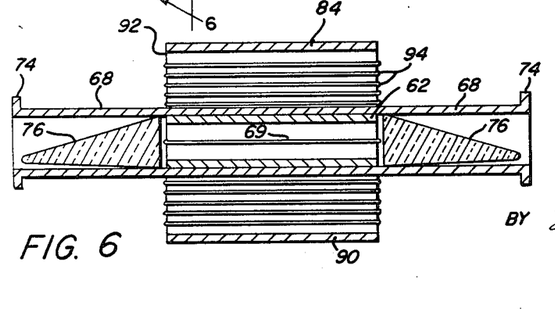
FIG. 6 is a longitudinal cross-sectional view of the embodiment along the line 6—6 in FIG. 5.

Referring next to FIGS. 5 and 6, still other features of the present invention together with alternative illustrative embodiments will be evident. Toroid members 62 and 64 are again symmetrically disposed on either side of a central ferrite member 66 within a rectangular waveguide section 68. Wires 69 and 70 are required for the latching operation and terminate in external connection means 72. There will be four such terminal means in the over-all embodiment. Waveguide flanges 74 are disposed adjacent opposing ends of the waveguide section for connection to other components of an over-all microwave system. Tapered dielectric transitions 76, 78 and 80 are positioned adjacent opposing ends of the ferrite members along the propagation path to provide efficient transition means by the reduction of reflections of electromagnetic energy during propagation in either direction.

The magnetization states of the toroid bodies are again established by means of passage of current pulses through the wires 69 and 70. The central ferrite member in this embodiment will be magnetized by means of an electromagnet 82 comprising magnetic pole piece members 84, 86, 88 and 90. Magnetic pole piece member 92 carries a driving coil 94 having a plurality of windings of conventional enameled copper wire connected to a suitable external voltage source. The magnetization states of the central ferrite member 66 may be reversed as desired by control of the current in the coil 94. The configuration of the electromagnet 82 is illustrative only and it is realized that where a constant magnetic field for the central ferrite member is desired suitable magnet means may be employed. In view of the requirement that the current pulses sent through the wires 69 and 70 produce oppositely directed magnetic flux fields it is permissible to connect the wires in series to external circuitry for convenience.

Figure 7:
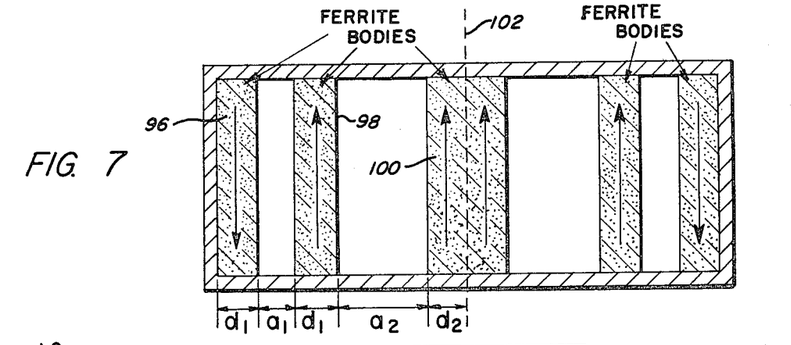
FIG. 7 is a diagrammatic representation of a section of rectangular waveguide containing five transversely magnetized ferrite structures used in the theoretical analysis and calculations of the illustrative embodiment of the invention.

A theoretical analysis of the toroid configuration illustrated in FIGS. 3–6 can be carried out if one considers each upright portion of a toroid structure as an independent slab of ferrite material. FIG. 7 shows the cross-section of a ferrite loaded waveguide which is very similar to that shown in FIG. 3, except that each toroid is now replaced by two oppositely magnetized slabs. As a result the waveguide now contains five ferrite slabs. The dimension $d_1$ is the physical thickness of the parallel upright walls 96 and 98 of one of the toroid members. The arrows indicate the opposite directions of the magnetic flux loop. Dimension $a_1$ indicates the spacing between the upright members or the width of the opening in the toroid through which the conductive wire passes. Dimension $a_2$ indicates the free space between the wall of the toroid and one of the side walls of the central ferrite member 100. Dimension $d_2$ is shown for one-half of the central ferrite member thickness since in accordance with the practice of the invention the objective of reciprocity is achieved by the symmetrical distribution of the magnetization states on either side of the axis of symmetry 102.

The relationship between the magnetic field vector $\vec{h}$ and the magnetic flux density $\vec{b}$ associated with the electromagnetic wave is generally of the form $$\vec{b} = \overset{\leftrightarrow}{\mu} \vec{h}$$

where $\overset{\leftrightarrow}{\mu}$ is the permeability. In the case of a magnetized ferrite the vectors $\vec{b}$ and $\vec{h}$ are in general not parallel. This is expressed mathematically by the fact that the permeability $\mu$ is in this case a three by three matrix, which has $$\overset{\leftrightarrow}{\mu}$$

the transformation properties of a tensor. It is well known to the art that in the case of ferrites which are magnetized in the direction of the positive Z-axis, the permeability tensor has the form $$\overset{\leftrightarrow}{\mu} = \begin{pmatrix} \mu & -j\kappa & 0 \\ j\kappa & \mu & 0 \\ 0 & 0 & \mu_z \end{pmatrix}$$

Here the first row and column refer to the X-direction, the second to the Y-direction and the third to the Z-direction. For a lossless medium the quantities $\mu$ and $\kappa$ are both real. If the ferrite is magnetized in the direction of the negative Z-axis the signs in front of the off-diagonal components $\pm j\kappa$ of the permeability tensor are reversed.

In the discussion which follows we designate the value of $\kappa$ appropriate for the ferrite toroids or the four outer slabs in the configuration of FIG. 7 as $\kappa_1$ and the value of $\kappa$ appropriate for the center slab as $\kappa_2$. Under the conditions envisaged in this invention, where the ferrite toroids are biased at or near the remanence point of the hysteresis loop, the quantities $\kappa_1$ and $\kappa_2$ are fairly small (typically of the order of ½). It has been shown by theoretical analysis that under these conditions the differential phase shift is to a good approximation proportional to $\kappa_1\kappa_2$ with a constant of proportionality which depends upon the dimensions $a_1$, $a_2$, $d_1$, and $d_2$ shown in FIG. 7, the frequency of operation, and the dielectric constant of the ferrite. The theoretical formula for the differential phase shift $\Delta\phi$ (in degrees) to be obtained in a ferrite loaded waveguide of length $l$ with a cross-section such as shown in FIG. 7 is $$\Delta\phi = 360° \Delta\Gamma l / \lambda_0$$

where $\lambda_0$ is the free space wavelength. The quantity $\Delta\Gamma$ is proportional to $\kappa_1\kappa_2$ and can be obtained by solving the characteristic equation for the propagation constant.

Figure 8:
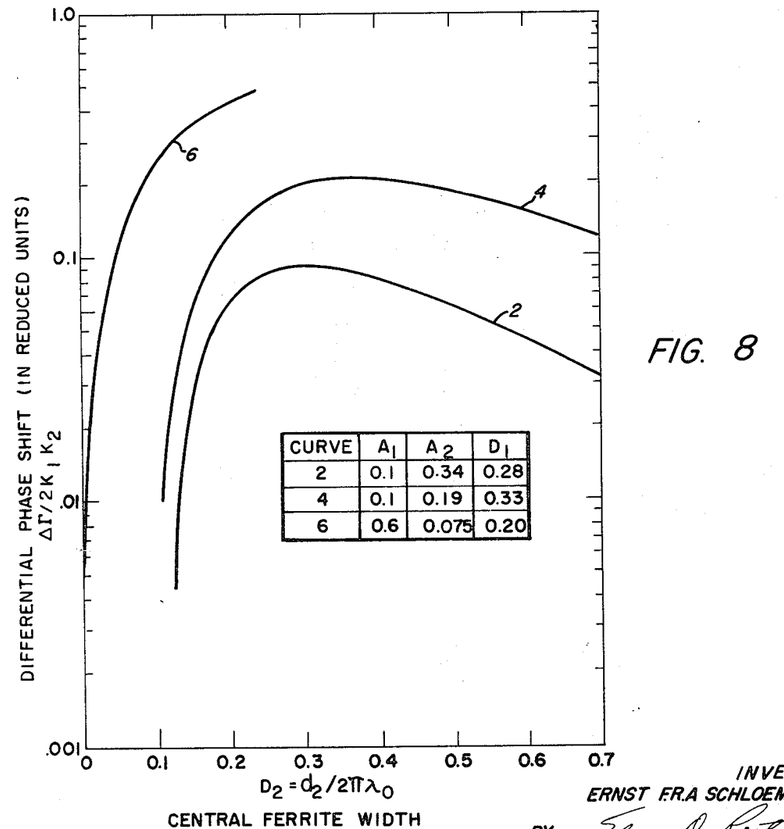
FIG. 8 is a curve plotting the differential phase shift versus thickness of a central ferrite member together with pertinent data useful in the construction of devices of the configuration shown in FIGS. 5 and 6.

FIGURE 8 summarizes some representative results of the theoretical calculation. Here $\Delta\Gamma/2\kappa_1\kappa_2$ is plotted versus $D_2 = d_2/2\pi\lambda_0$ for three sets of assumed values of $A_1 = a_1/2\pi\lambda_0$, $A_2 = a_2/2\pi\lambda_0$ and $D_1 = d_1/2\pi\lambda_0$. In the calculation it is assumed that the dielectric constant of the ferrite slabs is 16. This value is applicable in the case of ferrite materials with the garnet structure. The curves 2, 4 and 6 are related to the dimensions $A_1$, $A_2$ and $D_1$ by the legend shown in this illustration. Curve 6 has been terminated at the slab thickness $D_2$ at which the next higher order mode of propagation (the $TE_{20}$ mode) begins to propagate.

Experimental results obtained with actual embodiments utilizing rectangular waveguide sections of somewhat reduced cross-section and a ferromagnetic material with a remanent magnetization ($4\pi M_r$) of approximately 1,000 gauss for both the toroid and center ferrite structures indicated that the reciprocal differential phase shift actually obtained agrees quite well with the expected results.

Figure 9:
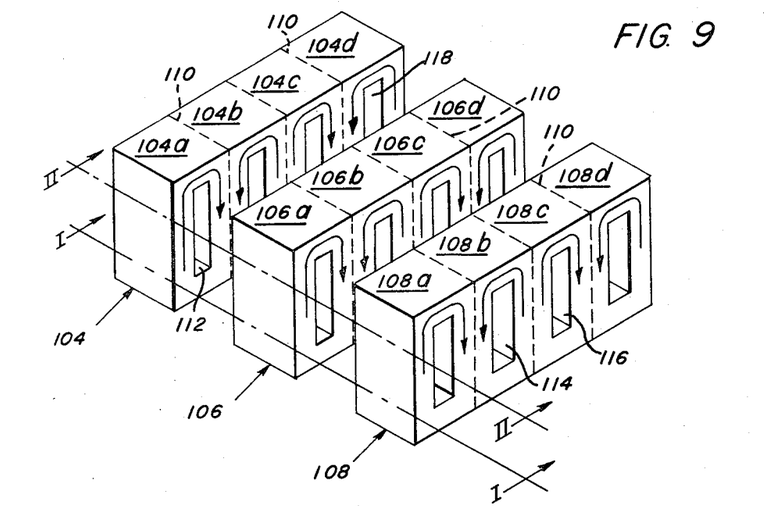
FIG. 9 is an isometric view of an array of ferrite toroid structures of another illustrative embodiment of the invention.
Figure 10A:
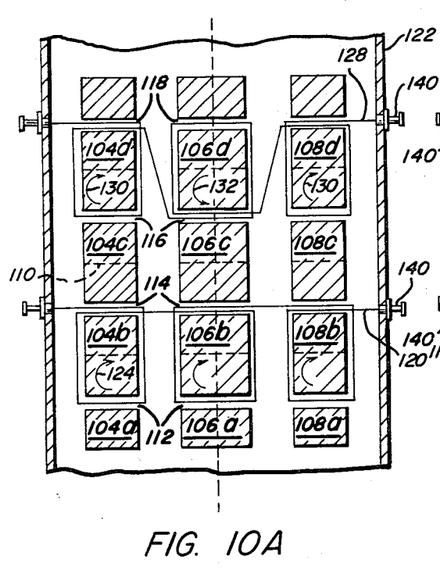
FIG. 10A is a plan view of a waveguide section containing the toroid structures of FIG. 9 configuration together with the suggested wiring arrangement for the switching of the magnetization states by conduction of current pulses taken along the line I—I in FIG. 9
Figure 10B:
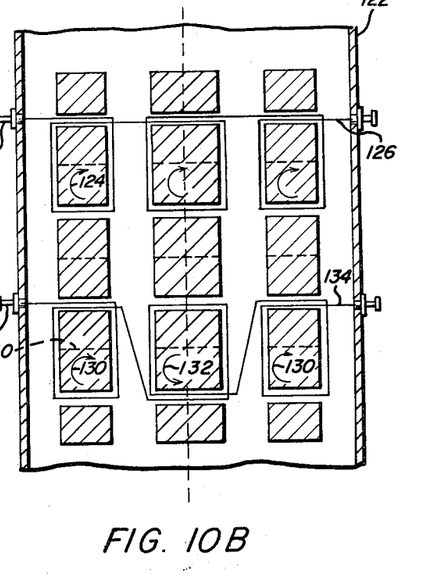
FIG. 10B is a similar view along the line II—II in FIG. 9.

An alternative embodiment of the present invention may also be practiced and is illustrated in FIGS. 9, 10A and 10B. The desired closure of the magnetic flux lines inside the toroid configuration may also be obtained by fabricating the ferrite bodies in a tandem array. Ferrite members 104, 106 and 108 generally designate three such arrays, each comprising in this illustration four toroids which have been designated by $a$, $b$, $c$ and $d$ for the sake of clarity. The dotted lines 110 are shown for illustrative purposes only and do not necessarily represent a physical cut. In the art of preparing ferrite materials it may be simpler to fabricate each ferrite member as an integral structure having the requisite passageways oriented transversely to the direction of propagation of electromagnetic waves while the ferrite members are oriented parallel to the longitudinal axis of the waveguide. Passageways 112, 114, 116 and 118 are similarly dimensioned for each of the ferrite members and are in alignment. In this configuration all toroid structures are again transversely magnetized, except for a relatively small region immediately above and immediately below the passageways. To achieve a complete understanding of the means for varying the magnetization states to accomplish phase shift, attention is now directed to FIGS. 10A and 10B illustrative of a preferred wiring arrangement to accomplish the latching feature of the present invention. For the sake of clarity FIG. 10A shows one-half of the requisite wiring arrangement along a line I—I and FIG. 10B shows the remaining one-half of the wiring arrangement along a line II—II. Reversal of the current pulses will then accomplish the reversal of the remanent states of magnetization. It is noted that any wiring arrangement may be utilized to accomplish the desired objectives of parallel or anti-parallel relationship of the outer and center ferrite members.

Wire 120 extending through the sidewall 122 of a section of rectangular waveguide is looped through the passageways 112 and 114 of each of the toroid members in a right circular manner indicated by the arrows 124. In FIG. 10B wire 126 is wound around the upper groups of toroids designated 104c and 104d, 106c and 106d and 108c and 108d by passing through passageways 116 and 118. The two wires 120 and 126, then, will produce a parallel state of magnetization in the three ferrite bodies which is symmetrical in each cross-section of the guide. This state of magnetization is similar to that shown in previously described FIGURES 2C and 2D. The anti-parallel state in which the outer ferrite members are magnetized opposite to that of the center ferrite slab will result by the arrangement of a wire 128 as shown in FIG. 10A wherein the loop extends in a right circular manner around the outer toroids and in the reverse or left-hand manner around the central toroids. Arrows 130 and 132 indicate this disposition of the windings. In FIG. 10B the lower group of toroid members are wound in a similar anti-parallel manner as indicated by the wire 134 and arrows 130 and 132. A complete operative structure therefore will have four wires each having two terminal connection means 140 to accomplish the two states of magnetization. It may also be advisable to wind certain electrical connections in series to simplify the wiring arrangement. The latter anti-parallel windings will result in the states of magnetization as shown in the previously described FIGS. 2A and 2B.

Figure 11:
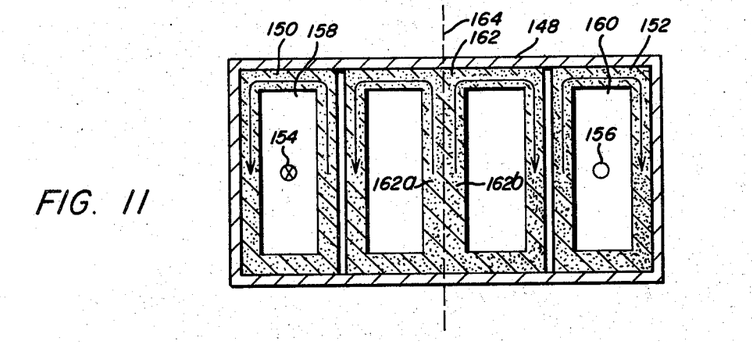
FIG. 11 is a cross-sectional view of another alternative embodiment of the invention.

Still another alternative embodiment is illustrated in FIG. 11. A waveguide section 148 is provided with outer toroid members 150, 152 together with wires 154, 156 extending within passageways 158, 160. The directions of magnetization are indicated by the arrows and similar principles of operation apply as those described in the discussion of FIGS. 3 and 5 on similar structure. The central ferrite member in this embodiment comprises an additional toroid structure 162 which is bisected by the center plane indicated by dotted line 164 and is coextensively disposed with the outer members. This central member may be fabricated in the same tubular configuration as the outer members with the magnetic field configurations desired along the central plane attained by two adjacent toroid loop portions 162a and 162b. In this illustration the arrows show a symmetrical distribution of the magnetization in each half of the cross-section through the waveguide. The central toroid member may be permanently magnetized before insertion in the waveguide section and for latching operation the current conductors 154 and 156 will be utilized in the manner hereinbefore described.

In all embodiments described herein it is understood in accordance with well known principles that varying degrees of phase shift will result with varying lengths of the ferrite structures. Material parameters may be selected to provide differential phase shifts in varying stages. Hence, one component in a tandem array may have material and field parameters furnishing a phase shift of 180°. Subsequent components in an array may then have phase shift values of 90°, 45°, 22.5° etc. By reason of the latching feature providing the two magnetization states any combination of phase shift desired may be provided for each component of a phased array antenna system. Designation of the magnetization states is also easily adapted to a digital computerized system with a binary code wherein the digit 0 will produce one set of values and the digit 1 will produce the second set of values. Reciprocal operation for either transmission or reception will also be provided.

It may also be mentioned that the generalization of the materials as being of a ferrite composition includes any other of the ferro or ferri magnetic materials having similar capabilities. In particular, some of the garnet varieties such as yttrium-iron may be suitably substituted where the designation ferrites appears. Propagation in other transmission line structures may also be evolved following the teachings of the present invention by means of suitable transducers and adapters to result in the propagation characteristics preferred. It will be evident, also, that the disposition of the conductive wires shown in FIGS. 10A and 10B will not in any way perturb the electric field or E-vector configuration associated with a fundamental type mode propagating through the wave transmission structure so as to degrade the performance desired.

The foregoing description of a reciprocal ferrite phase shifter will no doubt be subject to many other modifications or alterations by those skilled in the art. It is intended therefore that all such modifications or alterations as may be practiced are included within the scope and spirit of the invention as defined in the accompanying claims.

What is claimed is:
1. A reciprocal ferrite phase shifter comprising:
means defining a propagation path for electromagnetic waves in the fundamental TE mode;
a plurality of members of a ferrite magnetic material disposed within said wave propagation means;
said ferrite members comprising a discrete central body member disposed along the center plane of said wave propagation means and two outer body members spaced equidistantly from said center plane;
means for magnetizing all of said members transversely to the direction of propagation of said waves with the directions of magnetization through a cross section of said wave propagation means being symmetric with respect to said center plane;
and means for altering the relative directions of magnetization of said outer members similarly with respect to the magnetization of said central member to thereby alter the sense of polarization of the magnetic field associated with said waves at the center plane of said wave propagation means.

2. A reciprocal phase shifter comprising:
means defining a propagation path for electromagnetic waves in the fundamental TE mode;
a plurality of members of a ferrite magnetic material disposed within said wave propagation means;
said ferrite members being arranged coextensive along the longitudinal axis of said propagation path and comprising a discrete central body member and two outer body members with the center plane of said wave propagation means bisecting the central member whereby one-half of said central member and one of said outer members are disposed as mirror images of the remaining members;
means for magnetizing all of said members transversely to the direction of propagation of said waves;
and means for reversing the relative directions of magnetization of said outer members similarly with respect to the magnetization of said central member to thereby reverse the sense of polarization of the magnetic field associated with said waves at the center plane of said wave propagation means.

3. A reciprocal ferrite phase shifter comprising:
means defining a propagation path for electromagnetic waves;
said waves having an electric field component transverse to the direction of propagation and a magnetic field component parallel to the direction of propagation;
a plurality of members of a ferrite magnetic material disposed within said wave propagation means;
said ferrite members comprising a discrete central body member bisected by the center plane of said wave propagation means and two outer body members spaced equidistantly from said center plane;
means for magnetizing all of said members in a direction parallel to said electric field component;
and means for reversing the relative directions of magnetization of said outer members similarly with respect to the magnetization of said central member to thereby alter the phase shift induced in the propagated waves by the magnetized central member.

4. A reciprocal ferrite phase shifter comprising:
a section of rectangular waveguide having broad and narrow side walls for propagating electromagnetic waves;
said waves having an electric field component parallel to the narrow side walls and a magnetic field component parallel to the broad side walls;
a plurality of discrete ferrite body members disposed within said waveguide;
said ferrite body members comprising a central member and two outer members arranged with the center plane of said waveguide perpendicular to the broad walls to bisect said central member and the two outer members spaced equidistantly from said center plane;
and means for magnetizing all of said members parallel to the disposition of the electric field component with the directions of magnetization through a cross section of said waveguide being symmetric with respect to said center plane;
and means for reversing the relative directions of magnetization of said outer members similarly with respect to the magnetization of said central member to thereby alter the phase shift induced in the propagated waves by altering the sense of polarization of the magnetic field at the center plane of said waveguide.

5. A reciprocal ferrite phase shifter in accordance with claim 4 wherein the means for magnetizing said outer members is independent of the means for magnetizing said central member.

6. A reciprocal ferrite phase shifter in accordance with claim 4 wherein the direction of magnetization of said central member with respect to said outer members is parallel.

7. A reciprocal ferrite phase shifter in accordance with claim 4 wherein the direction of magnetization of said central member with respect to said outer members is anti-parallel.

8. A reciprocal ferrite phase shifter in accordance with claim 4 wherein the directions of magnetization of said outer members is reversed with respect to said central member.

9. A reciprocal ferrite phase shifter in accordance with claim 4 wherein the direction of magnetization of said central member is reversed with respect to said outer members.

10. A reciprocal ferrite phase shifter in accordance with claim 4 wherein at least one of said ferrite members comprises a plurality of ferrite bodies in tandem array with each body providing a predetermined phase shift value.

11. A reciprocal latching ferrite phase shifter comprising:
- a section of rectangular waveguide having broad and narrow side walls for propagating electromagnetic waves;
- said waves having an electric field component parallel to the narrow side walls and a magnetic field component parallel to the broad side walls;
- a plurality of ferrite members disposed within said waveguide;
- said ferrite members comprising a discrete central body member and two outer body members of a toroid configuration having a central hollow passageway, the center plane of said waveguide bisecting said said central member and the two outer toroid members being spaced equidistantly from said center plane;
- means for magnetizing all of said members parallel to the disposition of the electric field component;
- said magnetizing means for said toroid members comprising current conduction means extending through said toroid passageways whereby the direction of current flow in one toroid member is opposite to the other such member to result in opposite directions of magnetization and establish one state of magnetization of said toroid members;
- and means for reversing the direction of current flow to establish a second state of magnetization of said toroid members with respect to the direction of magnetization of said central member.

12. A reciprocal latching ferrite phase shifter in accordance with claim 11 wherein the means for magnetizing said central ferrite member is independent of the means for magnetizing said outer toroid members.

13. A reciprocal latching ferrite phase shifter in accordance with claim 11 wherein the direction of magnetization of said central member is reversed while maintaining the directions of magnetization of said outer toroid members constant.

14. A reciprocal latching ferrite phase shifter in accordance with claim 11 wherein the directions of magnetization of said outer toroid members is reversed while maintaining the direction of magnetization of said central member constant.

15. A reciprocal latching ferrite phase shifter in accordance with claim 11 wherein each of said outer toroid members comprise a plurality of hollow tubular ferrite bodies in tandem array and said center member comprises a corresponding number of ferrite bodies in tandem array with the lengths of all said ferrite bodies being selected to provide a predetermined phase shift value.

16. A reciprocal latching ferrite phase shifter comprising:
- a section of rectangular waveguide having broad and narrow side walls for propagating electromagnetic waves;
- said waves having an electric field component parallel to the narrow side walls and a magnetic field component parallel to the broad sidewalls;
- a plurality of toroid ferrite body members disposed with said waveguide in an array arranged symmetrically in rows along the longitudinal axis of said waveguide with the center plane perpendicular to the broad walls bisecting the central row and two outer rows spaced equidistantly from said center plane;
- all of said toroid members defining central hollow passageways aligned transverse to the longitudinal axis of said waveguide;
- current conduction means extending through said passageways having a predetermined direction of current flow to establish a direction of magnetization in each of said toroid members;
- and means for reversing the direction of current flow to establish a second direction of magnetization in each of said toroid members.

17. A reciprocal latching ferrite phase shifter in accordance with claim 16 wherein the directions of magnetization of said toroid members in said central row with respect to all said toroid members in said outer rows is parallel.

18. A reciprocal latching ferrite phase shifter in accordance with claim 16 wherein the directions of magnetization of said toroid members in said central row with respect to all said toroid members in said outer rows is anti-parallel.

19. A reciprocal latching ferrite phase shifter in accordance with claim 16 wherein said current conduction means comprise a conductive wire with windings around all of said toroid members being in a clockwise direction.

20. A reciprocal latching ferrite phase shifter in accordance with claim 16 wherein said current conduction means comprise a conductive wire with windings around all of said toroid members in said outer rows being in clockwise direction and the windings around all of said toroid members in said central row being in a counter-clockwise direction.

21. A reciprocal latching ferrite phase shifter comprising:
- a section of hollow pipe rectangular waveguide for propagating electromagnetic waves in the TE mode;
- a plurality of elongated tubular toroid ferrite members disposed within said waveguide in a symmetrical array comprising two outer members and a central member;
- all of said toroid members defining a passageway aligned parallel to the longitudinal axis of said waveguide;
- said central toroid member being bisected by the center plane of said waveguide and said outer members being spaced equidistantly from said center plane;
- said central toroid member further being permanently magnetized with the directions of magnetization being oriented in a predetermined manner;
- current conduction means extending through said outer toroid members' hollow passageways whereby the direction of current flow establishes a direction of magnetization of said members with respect to said central toroid member;
- and means for reversing the direction of current flow to establish a second direction of magnetization with respect to said central toroid member.

22. A reciprocal latching ferrite phase shifter in accordance with claim 21 wherein the directions of magnetization of all said toroid members is parallel with respect to said center plane.

23. A reciprocal latching ferrite phase shifter in accordance with claim 21 wherein the directions of magnetization of said outer toroid members with respect to said central toroid member is anti-parallel.

References Cited

UNITED STATES PATENTS 3,277,401  10/1966  Stern _____________ 333—24.1

HERMAN KARL SAALBACH, *Primary Examiner.*

PAUL L. GENSLER, *Assistant Examiner.*